United States Patent [19]

Mechem

[11] Patent Number: 4,461,577
[45] Date of Patent: Jul. 24, 1984

[54] VARIABLE HEIGHT CONCRETE TRUCK

[76] Inventor: Raymond W. Mechem, 5385 Kewanee Dr., Boulder, Colo. 80303

[21] Appl. No.: 498,139

[22] Filed: May 25, 1983

[51] Int. Cl.³ .............................................. B01F 9/02
[52] U.S. Cl. ....................................... 366/55; 366/60; 366/63
[58] Field of Search ...................... 366/28, 45, 53, 54, 366/55, 60, 61, 62, 63, 185, 187, 188, 189, 220, 232, 233, 603, 606; 414/468, 469

[56] References Cited

U.S. PATENT DOCUMENTS 3,131,913  5/1964  Swarthout ............................ 366/45
3,240,477  3/1966  Brennan et al. ....................... 366/60

Primary Examiner—Robert W. Jenkins
Assistant Examiner—Arthur D. Dahlberg
Attorney, Agent, or Firm—Klaas & Law

[57] ABSTRACT

The present invention comprises a compact variable height, concrete truck having a concrete mixing barrel which may be positioned in a raised position for maximum load transportation and concrete mixing and pouring, and which may be positioned in a lowered position for reduced load tranportation and concrete mixing and pouring and for low clearance truck storage. The raising and lowering of the barrel is performed by an elevation device mounted at the rear of the truck which causes the barrel to be pivoted in a vertical plane about a pivot point at the lower end of the barrel. Lock apparatus are provided for supporting the barrel in both a raised and a lowered position.

34 Claims, 5 Drawing Figures

VARIABLE HEIGHT CONCRETE TRUCK

BACKGROUND OF THE INVENTION

The present invention relates generally to trucks used for mixing, hauling and pouring concrete and more specifically to a truck having a concrete mixing barrel which may be raised and lowered in elevation with respect to the truck body for the purpose of transporting the truck into low clearance areas such as storage garages and the like.

Concrete mixing trucks of the type having a concrete mixing barrel rotatably mounted on a rear frame portion of the truck have long been in use for transporting concrete, as between a batch plant and a job site. The concrete mixing barrel contains an interior screw device which urges the concrete towards the mouth of the barrel. The barrel is generally inclined in a forward downwardly sloping direction relative to the truck bed with an open end in a raised position at the rear of the truck. When it is desired to pour concrete, the barrel is revolved in a direction which causes the screw to move the concrete in the direction of the barrel opening. The concrete is discharged from the barrel opening into a hopper and chute arrangement which may be pivoted to deliver the concrete to various locations at the rear of the truck. During transportation of the concrete between batch plant and job site concrete is mixed by slowly revolving the barrel in a direction which moves the concrete towards the closed end of the barrel.

In order to effectively carry, mix, and pour concrete, concrete trucks have in the past been provided with barrels which are inclined at a substantial angle. If a barrel is positioned at too small an angle from the horizontal full loading of the barrel is impossible. However, when a barrel is positioned at a relatively large angle of inclination, the vertical clearance distance of the barrel is substantial, usually several feet more than the clearance distance of the truck cab.

It would be generally desireable to provide a concrete truck having a barrel which could be repositioned for storage or for transportation of the truck in low clearance working environments. It would be particularly desireable to provide a small concrete truck having a barrel which, in a raised position, could carry a full load of concrete and which could be lowered to carry smaller loads in restricted height work environments or to store the truck in a standard size garage having a clearance of about 7 feet. Such a truck should be designed in a manner which allows the barrel to be stabilized in both a raised and a lowered position.

SUMMARY OF THE INVENTION

The present invention comprises a compact variable height concrete truck having a concrete mixing barrel means which may be positioned in a raised position for maximum load transportation and concrete mixing and pouring, and which may be positioned in a lowered position for reduced load transportation and concrete mixing and pouring and for low clearance truck storage. The raising and lowering of the barrel means is performed by an elevation means mounted at the rear of the truck which causes the barrel to be pivoted in a vertical plane about a pivot point at the lower end of the barrel. Lock means are provided for supporting the barrel means in both a raised and a lowered position.

BRIEF DESCRIPTION OF THE DRAWING

An illustrative and presently preferred embodiment of the invention is shown in the accompanying drawing in which.

DETAILED DESCRIPTION OF THE INVENTION

Figure 1:
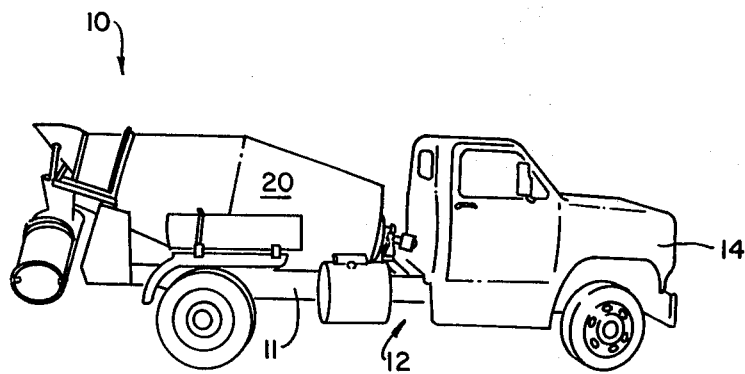
FIG. 1 is a side elevation view of a variable height concrete truck with a barrel in a lowered position.
Figure 2:
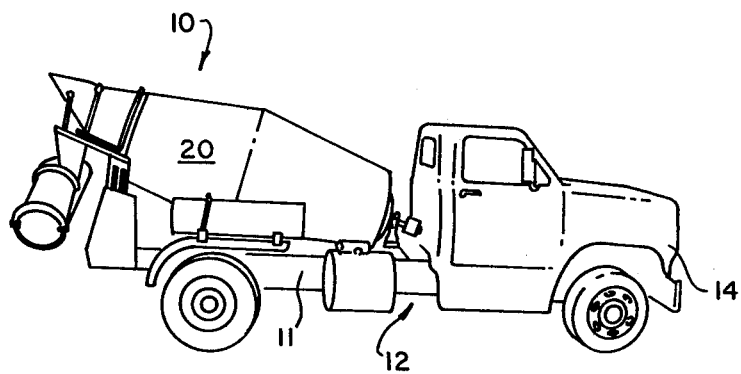
FIG. 2 is a side elevation view of a variable height concrete truck with a barrel in a raised position.
Figure 3:
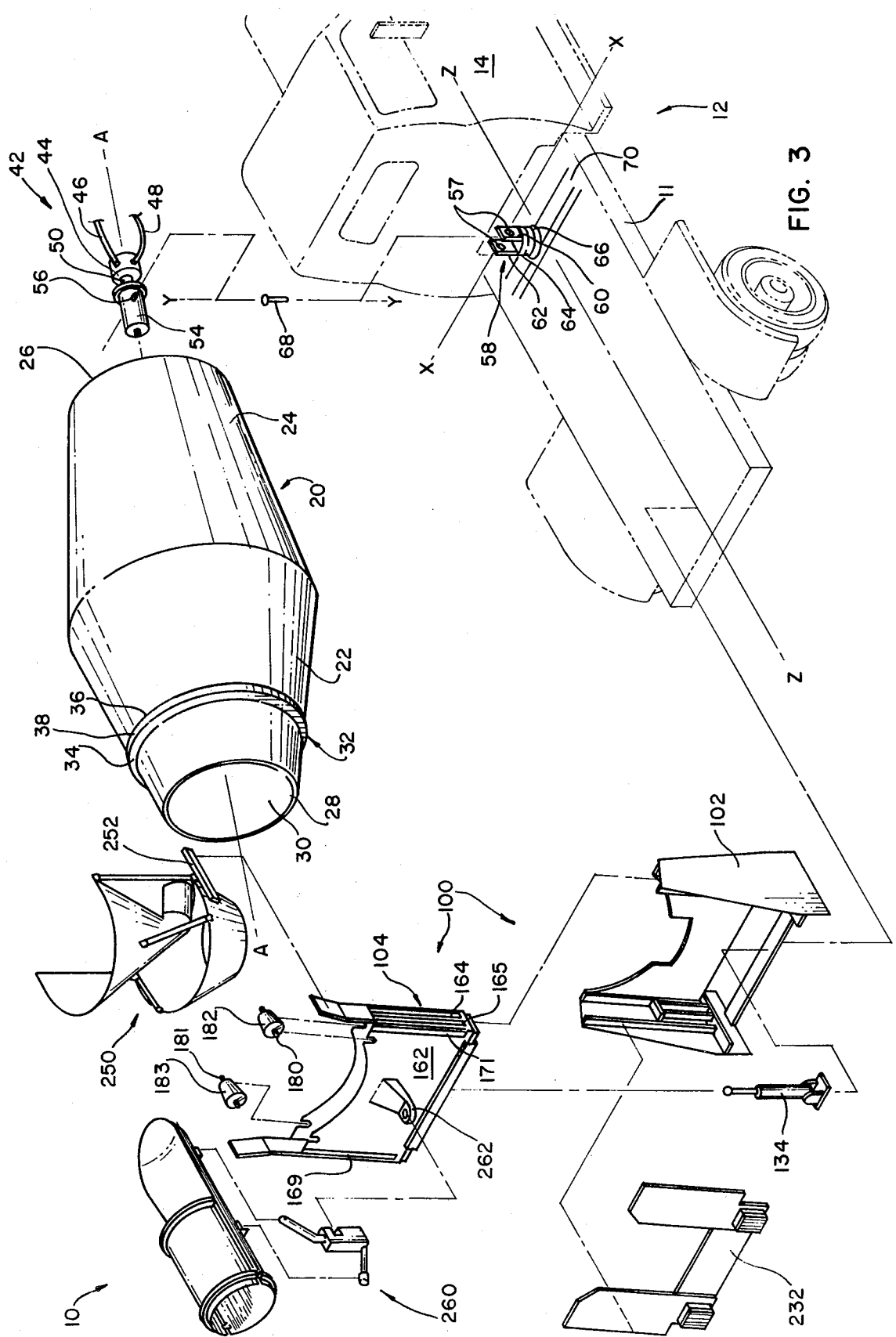
FIG. 3 is an exploded perspective view of a variable height concrete truck.

As illustrated by FIGS. 1, 2, and 3 the variable height concrete mixing truck 10, of the present invention has a barrel means 20 mounted on the frame portion 11 of a truck body 12 having a central longitudinal axis ZZ and having a forward cab portion 14. The barrel is pivotable between a lowered position, as illustrated in FIG. 1, and a raised position, as illustrated in FIG. 2. In a preferred embodiment, the truck is capable of carrying 3.3 cubic yards of concrete in a maximum load position and 2.5 cubic yards in a reduced load position and may be stored in a garage having a clearance of 82". In a raised position the clearance height is 96".

As shown by FIG. 3, the barrel means 20 comprises an elongate barrel having a central longitudinal axis AA. The barrel comprises an upper truncated conical portion 22 sealingly, fixedly attached as by weldment or the like to a lower truncated conical portion 24. The lower portion 24 has a closed lower end 26 and the upper portion has an upper end 28 with a circular upper end opening 30 therein. A rotation ring 32 mounted on a circumferential surface of the upper portion 22 comprises a rear surface 34, forward surface 36 and a rearwardly, inwardly sloping lateral surface 38. Lateral surface 38 is supported on roller means, as described in further detail hereinafter.

A rotation means 42, such as hydraulic motor 44 driven by hydraulic fluid supplied by hydraulic lines 46, 48, may be mounted on barrel drive shaft 50 fixedly attached to barrel lower end 26 in coaxial alignment with barrel longitudinal axis AA. The shaft 50 is supported by a rotational support means, such as sleeve 54, which may in turn be provided with lateral extending trunnions 56 received in holes 57 of U-shaped bracket 58. The holes 57 are provided in parallel vertical bracket arms 60,62 mounted on bracket body 64. The bracket body may in turn be pivotally mounted on a bracket mounting pad 66 as by bracket pivot pin 68. The bracket mounting pad 66 is in turn fixedly attached to frame member 70 of the truck body frame portion 11.

Through this arrangement the barrel means 20 is made pivotably about a laterally extending tilt axis XX in coaxial alignment with holes 57. The barrel is also pivotable about vertical axis YY in coaxial alignment with vertical pivot pin 68. Thus the barrel rotation axis AA is universally pivotable about a pivot point 75 at the intersection of axis XX and YY. This universal pivoting movement allows the barrel to be tiltable from a raised position to a lowered position and also accommodates lateral shifting movement of the barrel, such as may be experienced when the truck is driven over rough terrain.

Figure 4:
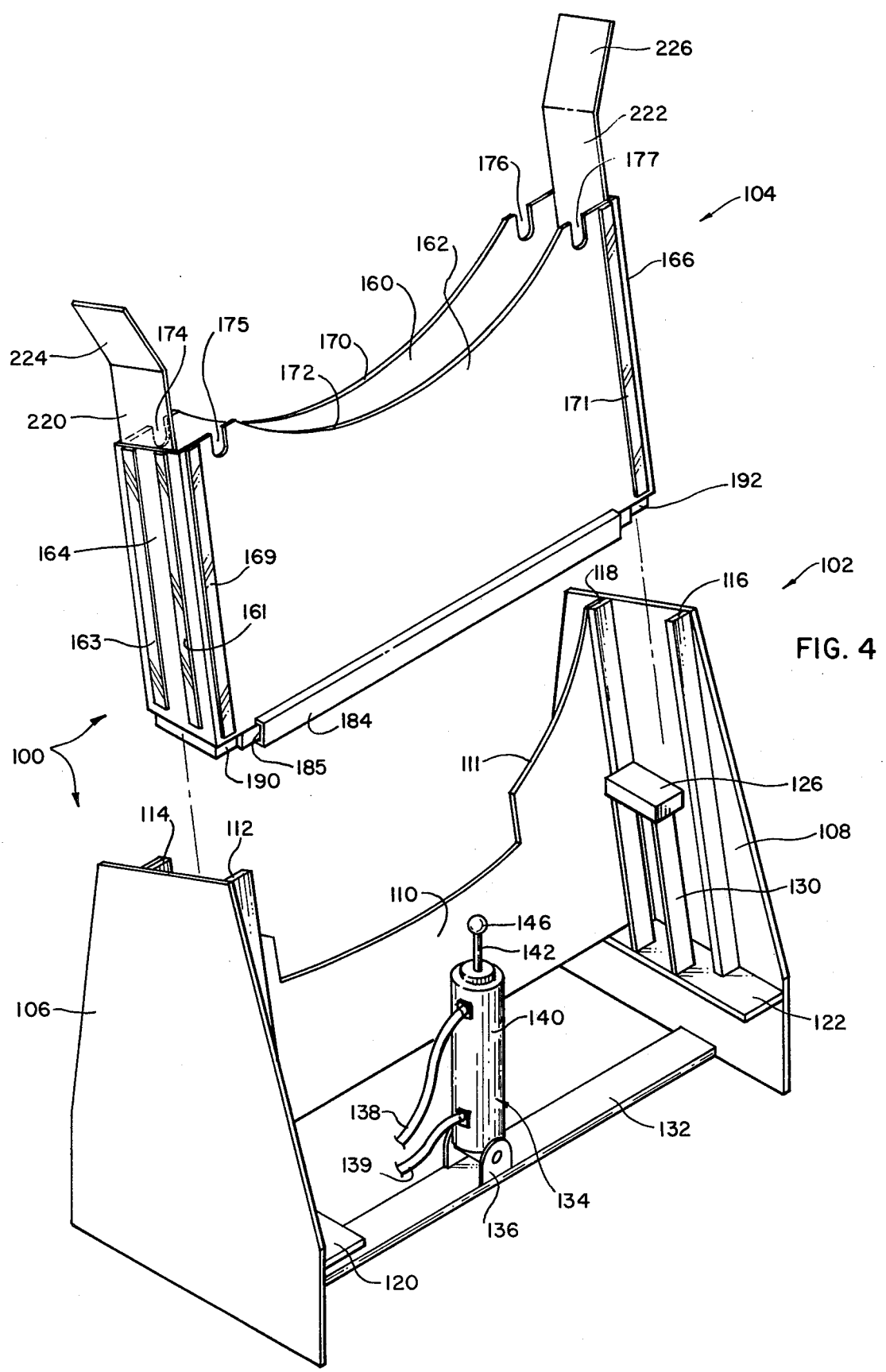
FIG. 4 is an exploded perspective view of a barrel elevating means of a variable height concrete truck.
Figure 5:
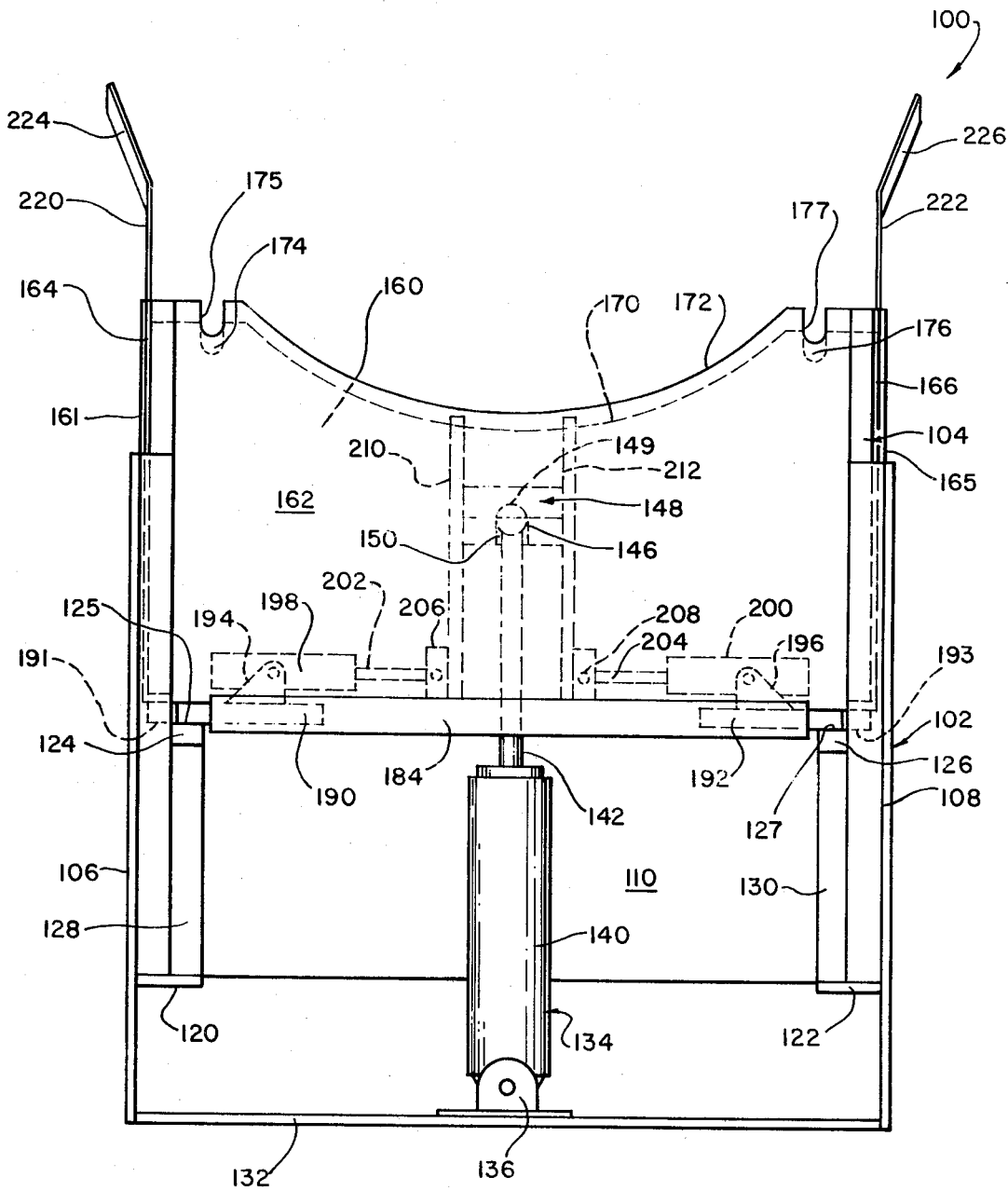
FIG. 5 is a rear elevation view of a barrel elevating means of a variable height concrete truck.

As illustrated by FIGS. 3, 4, and 5, an elevation means 100 is provided at the rear end of the truck frame for raising and lowering the rear portion of the barrel means 20. The elevation means 100 may comprise a main frame means 102 which slidingly supports a slide member 104 therein. The slide member 104 in turn rotatably supports the rear end portion 22 of the barrel 20 as described in further detail hereinafter.

The main frame means 102 as illustrated by FIGS. 4, and 5 may comprise a pair of spaced apart main frame lateral side plates 106, 108 which may be attached at lower portions thereof to the rear portion of the truck body frame 11 by bolts, welding, or other conventional attachment means well known in the art. A main frame transverse plate 110 is fixedly attached at the ends thereof to inner surfaces of lateral side plates 106, 108 as by welding and provides lateral support thereto. Transverse plate 110 may have a upper edge portion 111 cut in a shape to accommodate the upper surface 22 of barrel means 20 when the barrel means is in a lowered position. Forwardly and upwardly extending vertical guide plates 112, 114, 116, and 118 are fixedly attached to the inner surfaces of lateral plate members 106, 108 in order to provide guide surfaces for slide member means 104. A lower longitudinally extending horizontal stop plate 120, 122 is fixedly attached to the inner surface of each lateral side plate 106, 108 and to at the lower end surfaces of vertical guide plates 112, 114, 116, 118. The stop plates 120, 122 provide a lower stop surface for supporting slide member means 104 in a lowered position. Upper horizontal stop plates 124, 126 are positioned in spaced apart relationship from the inner surfaces of lateral side plates 106, 108. The upper horizontal stop plates 124, 126 are attached at forward lateral surfaces thereof to inclined vertical guide members 114, 118 and are attached at lower surfaces thereof to vertical support plate 128, 130 which are in turn weldingly attached at the lower ends thereof to lower horizontal stop plates 120, 122. The lateral spacing between members 124, 126 and main frame lateral side plates 106, 108 is sufficient to allow lateral plate portions 164, 166 of slide member means 104 to be spaced between upper stop plates 124, 126 and lateral side plates 104, 106 as described in further detail hereinafter. In the preferred embodiment, the spacing may be on the order of 1 inch.

A transversely extending cylinder support member 132 fixedly attached to lower surfaces of lateral plate members 106, 108 may be provided to support vertical movement means 134. The vertical movement means in the preferred embodiment is a hydraulic cylinder means mounted on a cylinder mounting means 136 such as the pin and clevis arrangement shown in the drawing. The cylinder means may comprise hydraulic cylinder lines 138, 139 operably attached to cylinder barrel 140 for providing hydraulic fluid under pressure thereto for conventionally actuating cylinder piston rod 142 in controlled extension and retraction therefrom. Cylinder rod 142 may be provided with a ball portion 146 at the end thereof for pivotally engaging a ball socket means 148 having a ball accepting portion 149 and having an enlarged cylindrical socket hole 150 of a diameter greater than the diameter of the cylinder rod 140 and smaller than the diameter of the ball portion 146 thereby accommodating limited laterally shifting movement of the socket means 148 relative the cylinder means 134 without causing damage thereto. The socket means 148 is mounted within slide means 104 as described in further detail hereinafter.

As illustrated by FIGS. 4 and 5, slide member means 104 comprises a hollow generally box like configuration having a forward transverse plate 160 mounted in parallel relationship with a rear transverse plate 162 which is a mirror image thereof. Transverse plates are connected by rigid attachment to lateral side plates 164, 166 as by weldment or the like. The plates 160, 162, 164, 166 are attached at right angles thus forming an open configuration having a cavity extending therethrough which has a generally rectangular configuration. Elongate brass strips 161, 163, 165, 169, 171 may be provided on outer surfaces portions of lateral plates 164, 166 and on outer forward and rear (not shown) surfaces of transverse plates 160, 162 to engage the inner surface of plates 106, 108 and guide plates 112, 114, 116, 118 to provide a smooth bearing surface to facilitate sliding movement.

In the preferred embodiment of the invention, the guide plates 112, 114, 116, 118 are inclined forwardly in generally tangential alignment with the path of arcuate movement of the barrel (i.e. a cylinder having a center at axis XX). Thus slide means 104 moves along this tangential path. The transverse plates have a curved upper portion 170, 172 with a radius of curvatures substantially equal to that of the surface of the portion of barrel means 120 which is positioned immediately thereabove as illustrated in FIGS. 1 and 2. Transverse plates 160, 162 also comprise roller receiver slots 174, 175, 176, 177 which accept axial portions 180, 182, of roller means 184, 186, FIG. 3, which may comprise a truncated conical shape for receiving lateral surface 38 of rotation ring 32 thereon. The roller means are mounted with the inwardly tapering portion thereof extending forward to allow slippage between the barrel rotation ring 32 and the roller means 184, 186 caused by linear movement of the slide means 104 with respect to the arcuate movement of the barrel means 20 as described in further detail hereinafter.

U-shaped bracket means 184, FIGS. 3 and 4, are provided at the lower edge of transverse plates 160, 162 have open channel portions 185 therein for receiving slide plates 190, 192 in sliding relationship therein. The U-shaped bracket means 184 may be fixedly attached to transverse plates 160, 162 as by weldment of an upper arm portion of each U-shaped bracket to the lower edge surface of an associated transverse plate. Each slide plate 190, 192 may be moved laterally inwardly and outwardly for the purpose of causing a lower surface thereof 191, 193 to engage an upper surface 125, 127 of upper stop means 124, 126 whereby the slide means 104 may be locked in a raised position. Thus, in the event of loss of hydraulic power to cylinder means 134, the barrel means 20 would not be be dropped from the raised position. This arrangement also prevents damage to the hydraulic system by allowing hydraulic pressure to the vertical cylinder to be relieved or depressurized by appropriate control valves (not shown) once the locking mechanism is engaged. With hydraulic lines to the cylinder isolated, the hydraulic system is not subject to sudden surges of pressure such as might be produced by external loading of the cylinder. Such external loading might be caused as by the truck's bouncing on a rough road or the like while the vertical cylinder is pressurized. Slide means 190, 192 may be moved by conventional means such as a lever rod (not shown) attached to a surface thereof and extending through a slot (not shown) in the forward transverse plate 160. In a preferred embodiment pivot brackets 194, 196 are mounted on an upper surface of each slide plate 190, 192 and pivotally receive horizontal cylinder means 198, 200 therein. Cylinder means 198, 200 comprise extendable and retractable cylinder arms 202, 204 which are attached to a fixed surface within the slide means 104 such as vertical plates 110, 112. The attachment means may be pin and clevis arrangement 206, 208 or other conventional arrangements which accommodate shifting movement to prevent injury to the cylinder means. Vertical plates 210, 212 may be rigidly attached at forward and rear edge surfaces thereof to inside surfaces of transverse plates 160, 162 and may support vertical cylinder ball socket means 148 therebetween. In such an arrangement the vertical plates 210, 212 must be sufficiently widely spaced to receive cylinder means 134 barrel portion 140 therebetween when the slide means is in a lowered position.

Barrel retaining arms 220, 222 having outwardly inclined portions 224, 226 thereon may be provided for receiving the barrel means 20 therebetween. The arms 220, 222 prevent the barrel from moving laterally when the truck is traveling over rough terrain and also provide a mounting surface for barrel changing and hopper means 250, FIG. 3 which may be of a conventional construction and may comprise longitudinally extending arm portions 252 which may be weldingly attached to barrel retaining arms 220, 222. A pivot bracket 262 as illustrated by FIG. 3 may be weldingly attached to the rear of the transverse plate member 162 for the purpose of supporting chute means 260 thereon. The chute means may be a conventional pivotal and folding chute means allowing concrete poured from the barrel means through the hopper means 250 to be placed in various locations proximate the rear end portion of the truck. A cover plate 232, FIG. 3, may be provided and conventionally removeably attached to keep the inner surfaces of the elevation means 100 relatively clean.

In operation, the barrel means 20 is pivotally supported at the rear end portion 26 thereof about rear pivot point 75 as described above. The upper end 22 of the barrel means is raised or lowered by sliding movement of slide means 104 within vertical frame means 102. The barrel is moveable between a lowered position wherein the slide means 104 lower surfaces 191, 193 engage lower stop plates 120, 122. The slide means 104 and thus the barrel means 20 may be raised by vertical cylinder means 134 to an upmost position with the slide means lower surface slightly above upper stop plates 124, 126. The horizontal slide plates 190, 192 may then be extended outwardly and the slide means 104 may thereafter be lowered slightly until the horizontal slide plates 190, 192 lower surfaces 191, 193 engage the upper surfaces 125, 127 of upper stop means 124, 126. In this raised position, the elevation of the barrel is such that a full load of concrete may be transported, mixed and poured from the barrel in a conventional fashion. In the lowered position, the upper portion of the barrel means 20 is positioned at a substantially lower height allowing the truck to be moved and stored in low clearance environments. Partial loads of concrete may also be transported with the barrel in the lowered position. In a preferred embodiment the length of the barrel from end to end is approximately 120 inches. The barrel has a maximum outer diameter of approximately 54 inches and is pivotable through a range of substantially 5½ degrees allowing the barrel to be inclined from a lower position of approximately 12½ degrees with the horizontal to an upper position of approximately 18 degrees with the horizontal. The upper end of the barrel in such a configuration, may be raised from a distance above the ground of approximately 82 inches in the lowered position to a distance above the ground of approximately 96 inches in the raised position.

It is contemplated that the inventive concepts herein described may be variously otherwise embodied and it is intended that the appended claims be construed to include alternative embodiments of the invention except insofar as limited by the prior art.

What is claimed is:

1. A relatively small variable height concrete truck for use and storage in restricted height environments comprising:

truck body means having a forward end and a rear end and a longitudinal axis extending therebetween for transportably supporting a concrete mixing barrel on a frame portion thereof;

concrete mixing barrel means for mixing and pouring concrete having a first open pouring end and a second closed nonpouring end and a central longitudinal axis extending between said ends;

barrel first end support means for rotatably supporting said barrel means first end;

barrel second end support means for rotatably supporting said barrel second end;

barrel rotation means for rotating said barrel means about said central longitudinal barrel axis;

barrel tilt axis means for providing pivotal movement of said barrel about a tilt axis at said barrel second and;

barrel elevation means for raising or lowering said barrel first end by pivotal movement of said barrel about said barrel tilt axis;

said barrel means comprising a lowered position wherein said barrel first end is positioned at a first distance above said truck body means frame portion and a raised position wherein said barrel first end is positioned at a second distance above said truck body means frame portion wherein said second distance is substantially greater than said first distance.

2. The invention of claim 1 wherein said barrel first end elevation means comprising locking means for selectively locking said barrel means in said raised position.

3. The invention of claim 1 wherein said barrel means rotation means comprises:

shaft means extending forwardly from said barrel means second end in substantially coaxial alignment with said barrel means central longitudinal axis;

sleeve means rotatably supporting said shaft means; and motor means for rotatably driving said shaft means mounted in fixed relationship relative said sleeve means.

4. The invention of claim 3 wherein said barrel tilt axis means comprises:

trunnion means mounted on said sleeve means for pivotally mounting said sleeve means in bracket means;

bracket means for receiving said trunnion means;

bracket mounting means for mounting said bracket means on said frame portion of said truck body means.

5. The invention of claim 4 wherein said bracket mounting means comprises vertical pivot axis means for pivotally mounting said bracket means on said frame means about a vertical pivot axis whereby said second end of said barrel means is universally pivotable in said truck body means.

6. The invention of claim 1 or 5 wherein said barrel first end elevation means comprises:
vertical frame means for slidingly supporting a slide member means;
slide member means slideably mounted in said vertical frame means for rotatably supporting said barrel means first end thereon; and
power cylinder means operably connected to said vertical frame means and said slide member means for producing sliding movement of said slide means within said vertical frame means.

7. The invention of claim 6 wherein said barrel first end elevation means comprises locking means for selectively locking said barrel means in said raised position.

8. The invention of claim 7 wherein said vertical frame means comprises spaced apart channel portions inclined upwardly and forwardly for accepting opposite lateral end portions of said slide member means wherein said channel portions are inclined substantially tangentially relative an arcuate portion of a cylinder having a center of curvature coincident with said tilt axis when said tilt axis is positioned perpendicular to the longitudinal axis of the truck.

9. The invention of claim 8 wherein said locking means comprises:
laterally extendable and retractable horizontal slide plate means operably mounted on a lower portion of said slide member for selective engagement and disengagement with said stop plate means; and
horizontally extending stop plate means mounted on said vertical frame means for engaging slide plates means on said slide member means when said barrel means is in the raised position.

10. The invention of claim 9 wherein said slide plate means comprise horizontal power cylinder means for causing horizontal sliding movement thereof.

11. The invention of claim 8 wherein said slide member means comprises an arcuate upper surface portion having an arc of curvature substantially equal to that of a portion of said barrel means received thereabove and having slot portions therein for receiving axis portions of roller means for rotatably mounting said barrel means on said slide member means.

12. The invention of claim 11 wherein said roller means comprise forwardly and inwardly tapering conical body portions and wherein said barrel means comprises a circumferential ring means adapted to receive said roller means thereon.

13. The invention of claim 11 further comprising lateral guard means mounted on the upper lateral edges of said slide member means for retaining said barrel means therebetween.

14. The invention of claim 9 wherein said slide member comprises a hollow boxlike configuration having an open top end and an open bottom end and wherein said slide member is mounted in circumscribing relationship about said horizontally extending stop plate means.

15. The invention of claim 14 wherein said laterally extendable and retractable side plate means are slideably mounted for selectively opening and closing predetermined portions of said open bottom end of said slide member.

16. The invention of claim 15 further comprising lower stop means for engaging said slide plate means when said barrel means is in said lowered position.

17. A compact variable height concrete truck for efficiently carrying, mixing, and pouring loads of concrete in relatively low clearance work environments and normal clearance work environments comprising:
a truck body having a central longitudinal truck axis, and a top portion and a bottom portion and including a forwardly positioned cab portion and a frame portion extending rearwardly from said cab portion and terminating at a frame rear end portion;
a concrete mixing barrel having a central longitudinal barrel axis and being of substantially the same maximum width and substantially the same length as the truck body frame portion, said concrete mixing barrel being mounted above said truck body frame portion with said central longitudinal barrel axis in substantially coplanar relationship with said central longitudinal truck axis;
said barrel having a forward end and a rear end, said barrel forward end being a closed end, said barrel rear end comprising an opening therein for receiving and discharging concrete therefrom; barrel rotation means for rotating said barrel means about said barrel central longitudinal axis; and
barrel elevation means for elevating and lowering said barrel between a raised position and a lowered position relative said truck body frame portion, said barrel elevation means comprising a main frame, a sliding member means for guided sliding movement within said main frame means and for rotatingly supporting said barrel means, and hydraulic cylinder means for causing relative movement between said main frame and said slide member means.

18. The invention of claim 17 wherein:
said barrel comprises a forward truncated cone portion tapering inwardly in a forward direction and a rear truncated cone portion tapering inwardly in a rearward direction;
said forward and rear truncated cone portions being sealingly fixedly connected at a mid portion of said barrel, whereby said barrel comprises a relatively large diameter mid portion and relatively small diameter front end and rear end portions;
said barrel having a barrel ring having a ring central longitudinal axis positioned in coaxial alignment with said barrel central longitudinal axis and fixedly mounted on the exterior surface of said rear truncated cone.

19. The invention of claim 17 wherein said barrel rotation means comprises:
a barrel drive shaft fixedly attached to said barrel front end in coaxial alignment with said barrel longitudinal axis;
a drive shaft sleeve for rotatingly supporting said barrel drive shaft; and
motor means operably attached to said barrel drive shaft for reversibly rotating said drive shaft within said sleeve.

20. The invention of claim 19 wherein:
said drive shaft sleeve is pivotally supported for pivotal motion about a horizontal pivot axis by trunnions fixedly mounted on the exterior surface of said drive shaft sleeve and U-shaped bracket means adapted to pivotally accept said trunnions in vertical arm portions thereof, said U-shaped bracket having a horizontally extending bracket body portion fixedly connecting said vertical arm portions.

21. The invention of claim 20 wherein:
said bracket body portion is pivotally mounted by a vertical pivot pin to a bracket mounting block fixedly attached to said truck frame portion at a forward position thereon adjacent said truck cab portion whereby said U-shaped bracket is pivotable about a vertical pivot axis, said vertical pivot axis and said horizontal pivot axis intersecting at a pivot point whereby said barrel is universally pivotable about said pivot point.

22. The invention of claim 20 wherein:
said hydraulic cylinder means for causing relative movement between said main frame and said slide member means comprises:
a cylinder barrel operably attached to said main frame transversely extending cylinder support member; and
an extendable and retractable piston arm having a ball portion at the free end thereof operably mounted in said ball socket attached within said slide member means;
said barrel means being pivotable about said horizontal pivot axis between said raised position and said lowered position by selective extension and retraction of said cylinder means piston arm.

23. The invention of claim 17 wherein said barrel elevation means main frame comprises:
a pair of spaced apart main frame lateral side plates attached at lower ends thereof to said truck body frame portion rear end portion;
a main frame transverse plate fixedly attached at lateral ends thereof to forward portions of said spaced apart lateral side plates.

24. The invention of claim 23 wherein said main frame further comprises guide means for guiding the movement of said sliding member means.

25. The invention of claim 24 wherein said guide means comprise:
forwardly and upwardly extending guide plates fixedly attached to inner surfaces of said main frame lateral side plates to provide guide surfaces for said slide member means.

26. The invention of claim 25 wherein said main frame further comprises:
lower longitudinally extending horizontal stop plates fixedly attached to said inner surface of an associated main frame lateral side plate and to lower end surfaces of associated guide plates, said lower stop plates providing a lower stop surface for supporting said slide member means in said lowered position.

27. The invention of claim 26 wherein said main frame comprises upper stop means for supporting said slide member means in said raised position.

28. The invention of claim 27 wherein said upper stop means comprises:
upper horizontal stop plates positioned in spaced apart relationship from said inner surfaces of an associated main frame lateral side plate said upper horizontal stop plates being attached at lower surfaces thereof to associated upper stop vertical support plates, said upper stop vertical support plates being fixedly attached at lower ends thereof to associated main frame lower horizontal stop plates the lateral spacing between said upper horizontal stop plates and said lateral side plates being sufficient to allow associated lateral plate portions of said slide member means to be positioned between said upper stop plates and said main frame lateral side plates.

29. The invention of claim 28 wherein said main frame comprises:
a transversely extending cylinder support member fixedly attached to lower surfaces of said lateral plate members and extending therebetween.

30. The invention of claim 29 wherein:
said slide member means has a hollow generally box like configuration comprising:
a forward slide member transverse plate;
a rear slide member transverse plate positioned in parallel relationship with said forward slide member transverse plate;
slide member lateral side plates;
said slide member lateral side plates and transverse plates being fixedly attached at right angles whereby an open ended configuration having a cavity extending therethrough is formed, said cavity having a generally rectangular cross section.

31. The invention of claim 30 wherein said slide member means comprises:
U-shaped bracket means fixedly mounted at the lower edges of said sliding member transverse plates and having open transversely extending channel portions therein for receiving horizontal slide plates in sliding relationship therein; and
two horizontal slide plates, each slide plate being movable laterally inwardly and outwardly for causing a lower surface thereof to engage an upper surface of an associated upper stop plate whereby said slide member means is locked in said raised position.

32. The invention of claim 31 wherein said slide member means comprises:
elongate brass strips fixedly mounted on outer surface portions of said slide member lateral plates and on outer forward and rear surfaces of said slide member transverse plates for engaging the inner surface of said main frame lateral side plates and guide plates to provide a smooth bearing surface to facilitate sliding movement of said slide member means within said main frame;
said slide member transverse plates having a curved upper portion having a radius of curvatures substantially equal to that of a surface portion of said barrel positioned immediately thereabove said slide member transverse plates having roller receiving slots for accepting axle portions of rollers, said rollers having outer truncated conical surfaces and being mounted in said slots with the smaller diameter portion of said rollers of extending forwardly, said rollers being rotatably mounted in said slots and adapted to rollingly accept a barrel ring mounted on a rear portion of said barrel whereby said rear portion of said barrel is rotatably supported on said slide member means;
slide member vertical plates rigidly attached at forward and rear edge surfaces thereof to inside surfaces of said slide member transverse plates and having a ball receiving socket rigidly attached therebetween.

33. The invention of claim 32 wherein said slide member means further comprises:
- upwardly extending barrel retaining arms for receiving said barrel therebetween for preventing said barrel from moving laterally;
- barrel charging and hopper apparatus having longitudinally extending hopper arm portions fixedly attached to said barrel retaining arms;
- a pivot bracket fixedly attached to said slide member rear transverse plate member;
- a pivotable and foldable chute operably attached to said pivot bracket and said hopper apparatus for allowing concrete poured from said barrel means through said hopper apparatus to be placed in various locations proximate the rear end portion of said truck body.

34. A compact variable height concrete truck for efficiently carrying, mixing, and pouring loads of concrete in relatively low clearance work environments and normal clearance work environments comprising:
- a truck body having a central longitudinal truck axis, and a top portion and a bottom portion and including a forwardly positioned cab portion and a frame portion extending rearwardly from said cab portion and terminating at a frame rear end portion;
- a concrete mixing barrel having a central longitudinal barrel axis and being of substantially the same maximum width and substantially the same length as the truck body frame portion, said concrete mixing barrel being mounted above said truck body frame portion with said central longitudinal barrel axis in substantially coplanar relationship with said central longitudinal truck axis;
- said barrel having a forward end and a rear end, said barrel forward end being a closed end, said barrel rear end comprising an opening therein for receiving and discharging concrete therefrom;
- said barrel comprising a forward truncated cone portion tapering inwardly in a forward direction and a rear truncated cone portion tapering inwardly in a rearward direction;
- said forward and rear truncated cone portions being sealingly fixedly connected at a mid portion of said barrel, whereby said barrel comprises a relatively large diameter mid portion and relatively small diameter front end and rear end portions;
- said barrel having a barrel ring having a ring central longitudinal axis positioned in coaxial alignment with said barrel central longitudinal axis and fixedly mounted on the exterior surface of said rear truncated cone;
- barrel rotation means for rotating said barrel means about said barrel central longitudinal axis comprising:
  - a barrel drive shaft fixedly attached to said barrel front end in coaxial alignment with said barrel longitudinal axis;
  - a drive shaft sleeve for rotatingly supporting said barrel drive shaft; and
  - motor means operably attached to said barrel drive shaft for reversibly rotating said drive shaft within said sleeve;
  - said drive shaft sleeve being pivotally supported for pivotal motion about a horizontal pivot axis by trunnions fixedly mounted on the exterior surface of said drive shaft sleeve and U-shaped bracket means adapted to pivotally accept said trunnions in vertical arm portions thereof, said U-shaped bracket having a horizontally extending bracket body portion fixedly connecting said vertical arm portions, said bracket body portion being pivotally mounted by a vertical pivot pin to a bracket mounting block fixedly attached to said truck frame portion at a forward position thereon adjacent said truck cab portion whereby said U-shaped bracket is pivotable about a vertical pivot axis, said vertical pivot axis and said horizontal pivot axis intersecting at a pivot point whereby said barrel is universally pivotable about said pivot point;
- barrel elevation means for elevating and lowering said barrel between a raised position and a lowered position relative said truck body frame portion, said barrel elevation means comprising a main frame, a sliding member means for guided sliding movement within said main frame means and for rotatingly supporting said barrel means, and hydraulic cylinder means for causing relative movement between said main frame and said slide member means;
- said main frame comprising:
  - a pair of spaced apart main frame lateral side plates attached at lower ends thereof to said truck body frame portion rear end portion;
  - a main frame transverse plate fixedly attached at lateral ends thereof to forward portions of said spaced apart lateral side plates and having an upper edge portion cut in a shape to accommodate the curvature of said concrete mixing barrel when said barrel is in said lowered position;
  - forwardly and upwardly extending guide plates fixedly attached to inner surfaces of said main frame lateral side plates to provide guide surfaces for said slide member means;
  - lower longitudinally extending horizontal stop plates fixedly attached to said inner surface of an associated main frame lateral side plate and to lower end surfaces of associated guide plates, said lower stop plates providing a lower stop surface for supporting said slide member means in a lowered position;
  - upper horizontal stop plates positioned in spaced apart relationship from said inner surface of an associated main frame lateral side plate said upper horizontal stop plates being attached at lower surfaces thereof to associated upper stop vertical support plates, said upper stop vertical support plates being fixedly attached at lower ends thereof to associated main frame lower horizontal stop plates the lateral spacing between said upper horizontal stop plates and said lateral side plates being sufficient to allow associated lateral plate portions of said slide member means to be positioned between said upper stop plates and said main frame lateral side plates; and
  - a transversely extending cylinder support member fixedly attached to lower surfaces of said lateral plate members and extending therebetween;
- said slide member means having a hollow generally box like configuration and comprising:
  - a forward slide member transverse plate;
  - a rear slide member transverse plate positioned in parallel relationship with said forward slide member transverse plate;

slide member lateral side plates;
said slide member lateral side plates and transverse plates being fixedly attached at right angles whereby an open ended configuration having a cavity extending therethrough is formed, said cavity having a generally rectangular cross section;
elongate brass strips fixedly mounted on outer surface portions of said slide member lateral plates and on outer forward and rear surfaces of said slide member transverse plates for engaging the inner surface of said main frame lateral side plates and guide plates to provide a smooth bearing surface to facilitate sliding movement of said slide member means within said main frame;
said slide member transverse plates having a curved upper portion having a radius of curvatures substantially equal to that of a surface portion of said barrel positioned immediately thereabove said slide member transverse plates having roller receiving slots for accepting axle portions of said rollers;
said rollers having outer truncated conical surfaces mounted with the small diameter portion thereof extending forwardly said rollers being rotatably mounted in said slots and adapted to rollingly accept said barrel ring whereby said rear portion of said barrel is rotatably supported on said slide member means;
U-shaped bracket means fixedly mounted at the lower edges of said sliding member transverse plates and having open transversely extending channel portions therein for receiving horizontal slide plates in sliding relationship therein;
two horizontal slide plates, each slide plate being moveable laterally inwardly and outwardly for causing a lower surface thereof to engage an upper surface of an associated upper stop plate whereby said slide member means is locked in said raised position;
slide member vertical plates rigidly attached at forward and rear edge surfaces thereof to inside surfaces of said slide member transverse plates and having a ball receiving socket rigidly attached there- between;
barrel retaining arms having outwardly inclined portions thereon for receiving said barrel therebetween for preventing said barrel from moving laterally and for mounting barrel charging and hopper apparatus having longitudinally extending hopper arm portions fixedly attached to said barrel retaining arms;
a pivot bracket fixedly attached to said slide member rear transverse plate member;
a pivotable and foldable chute operably attached to said pivot bracket and said hopper apparatus for allowing concrete poured from said barrel means through said hopper apparatus to be placed in various locations proximate the rear end portion of said truck body;
said hydraulic cylinder means for causing relative movement between said main frame and said slide member means having a cylinder barrel operably attached to said main frame transversely extending cylinder support member and having an extendable and retractable piston arm having a ball portion at the free end thereof operably mounted in said ball socket attached within said slide member means;
said barrel means being pivotable about said horizontal pivot axis between said raised position and said lowered position by selective extension and retraction of said cylinder means piston arm.

* * * * *